(12) United States Patent
Kim et al.

(10) Patent No.: US 9,123,957 B2
(45) Date of Patent: Sep. 1, 2015

(54) RECHARGEABLE LITHIUM BATTERY

(75) Inventors: Seon-Hye Kim, Yongin-si (KR); Won-Il Jung, Yongin-si (KR); Yong-Chul Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 483 days.

(21) Appl. No.: 13/523,750

(22) Filed: Jun. 14, 2012

(65) Prior Publication Data

US 2013/0095382 A1 Apr. 18, 2013

(30) Foreign Application Priority Data

Oct. 12, 2011 (KR) .................. 10-2011-0104093

(51) Int. Cl.
| | |
|---|---|
| *H01M 4/505* | (2010.01) |
| *H01M 4/131* | (2010.01) |
| *H01M 4/58* | (2010.01) |
| *H01M 4/13* | (2010.01) |
| *H01M 4/64* | (2006.01) |
| *H01M 4/02* | (2006.01) |
| *H01M 4/485* | (2010.01) |
| *H01M 4/525* | (2010.01) |
| *H01M 4/62* | (2006.01) |
| *H01M 10/0525* | (2010.01) |
| *H01M 4/136* | (2010.01) |

(52) U.S. Cl.
CPC .............. *H01M 4/505* (2013.01); *H01M 4/131* (2013.01); *H01M 4/5825* (2013.01); *H01M 4/622* (2013.01); *H01M 4/13* (2013.01); *H01M 4/136* (2013.01); *H01M 4/485* (2013.01); *H01M 4/525* (2013.01); *H01M 4/621* (2013.01); *H01M 4/64* (2013.01); *H01M 10/0525* (2013.01); *H01M 2004/028* (2013.01); *H01M 2300/0037* (2013.01); *Y02E 60/122* (2013.01)

(58) Field of Classification Search
CPC ......... H01M 4/13; H01M 4/485; H01M 4/50; H01M 4/52; H01M 4/622; H01M 4/64; H01M 10/052; H01M 2004/028; H01M 4/505; H01M 4/5825; H01M 4/621; H01M 10/0525; Y02E 60/122
USPC ........................... 429/231.1, 231.3, 217, 233
See application file for complete search history.

(56) References Cited

U.S. PATENT DOCUMENTS

| | | | |
|---|---|---|---|
| 7,759,007 B2 | 7/2010 | Tokunaga et al. | |
| 2011/0003207 A1 | 1/2011 | Oh | |
| 2012/0251884 A1* | 10/2012 | Leitner et al. | 429/224 |

FOREIGN PATENT DOCUMENTS

| | | | |
|---|---|---|---|
| JP | 7-254436 | | 10/1995 |
| JP | 2007-194202 | | 8/2007 |
| KR | 2001-0010226 | * | 2/2001 |
| KR | 1019990028989 | | 2/2001 |
| KR | 10-2003-0012557 A | | 2/2003 |
| KR | 10-2009-0041470 | | 4/2009 |
| KR | 10-2009-0109649 | | 10/2009 |

OTHER PUBLICATIONS

Machine English Translation of JP 07-254436, 9 pages, 1995.
Korean Patent Abstracts, Publication No. 2001-0010226, dated Feb. 5, 2001, for corresponding Korean Patent 1019990028989.

* cited by examiner

*Primary Examiner* — Laura Weiner
(74) *Attorney, Agent, or Firm* — Christie, Parker & Hale, LLP

(57) ABSTRACT

A rechargeable lithium battery that includes a negative electrode including a negative active material; a positive electrode including polyacrylonitrile and a positive active material which is capable of fully charging at about 4.3V or more; and a non-aqueous electrolyte.

4 Claims, 3 Drawing Sheets

RECHARGEABLE LITHIUM BATTERY

CROSS-REFERENCE TO RELATED APPLICATION

This application claims priority to and the benefit of Korean Patent Application No. 10-2011-0104093, filed in the Korean Intellectual Property Office on Oct. 12, 2011, the entire content of which is incorporated herein by reference.

BACKGROUND

1. Field

A rechargeable lithium battery is disclosed.

2. Description of Related Art

Batteries generate electric power using electrochemical reaction materials (referred to hereinafter simply as "active materials") at a positive electrode and a negative electrode. Examples of the batteries are lithium rechargeable batteries which generate electrical energy from changes of chemical potential during the intercalation/deintercalation of lithium ions at the positive and negative electrodes.

A lithium rechargeable battery uses both positive and negative active materials that reversibly intercalate or deintercalate lithium ions during charge and discharge reactions, and contain an organic electrolyte or a polymer electrolyte between the positive electrode and the negative electrode.

As for negative active materials of rechargeable lithium batteries, various carbon-based materials such as artificial graphite, natural graphite, and hard carbon, which can all intercalate and deintercalate lithium ions, have been used.

For positive active materials of rechargeable lithium batteries, lithium-transition element composite oxides being capable of intercalating lithium, such as $LiCoO_2$, $LiMn_2O_4$, $LiNiO_2$, $LiNi_{1-x}Co_xO_2$ (0<x<1), $LiMnO_2$, $LiFePO_4$, or the like, have been researched.

SUMMARY

An aspect of an embodiment of the present invention is directed toward a rechargeable lithium battery having excellent cycle-life characteristics.

According to an embodiment of the present invention, provided is a negative electrode including a negative active material; a positive electrode including polyacrylonitrile and a positive active material which is capable of fully charging at about 4.3V or more; and a non-aqueous electrolyte with the positive electrode and the native electrode.

The positive active material may be manganese-based lithium oxide.

The positive active material may be $Li_{1+x}M1_yMn_{2-y-z}M2_zO_{4+w}$ (0≤x<0.2, 0.4≤y≤0.6, 0≤z≤0.2, 0≤w≤0.1, M1 is a metal ion selected from Cr, Fe, Co, Ni, Cu, Zr, Ti, B, and combinations thereof, and M2 is a metal ion selected from Al, Ti, Mg, Zn, and combinations thereof) or may be $Li_xM3_yCo_zPO_4$ (0≤x≤2, 0.98≤y≤1, 0.00≤z≤0.02, M3 is a metal ion selected from Co, Ni, Zr, Ti, B, and combinations thereof).

The positive electrode may include a current collector and a positive active material layer, and the positive active material layer may include about 1 wt % to about 5 wt % of polyacrylonitrile based on 100 wt % of the positive active material layer.

The positive electrode may further include oxalic acid.

The positive electrode may further include an additional binder selected from polyvinylalcohols, carboxylmethylcelluloses, hydroxypropylcelluloses, diacetylcelluloses, polyvinylchlorides, carboxylated polyvinylchlorides, polyvinylfluorides, ethylene oxide-containing polymers, polyvinylpyrrolidones, polyurethanes, polytetrafluoroethylenes, polyvinylidenefluoride-tetrafluoroethylene copolymers, polyvinylidenefluorides, polyacrylonitrile-alkyl(meth)acrylates (wherein alkyl is a C1 to C10 alkyl group), polyethylenes, polypropylenes, styrene-butadiene rubbers, acrylated styrene-butadiene rubbers, epoxy resins, nylons, and combinations thereof.

The polyacrylonitrile and the additional binder may be included in a weight ratio ranging from about 2:3 to about 3:2.

When the positive electrode further includes oxalic acid, the oxalic acid may be included in an amount ranging from about 0.1 wt % to about 0.4 wt % based on 100 wt % of the sum of polyacrylonitrile and the oxalic acid, or about 0.1 wt % to about 0.4 wt % based on 100 wt % of the sum of polyacrylonitile, the oxalic acid, and the additional binder.

The rechargeable lithium battery may reduce problems such as volume change of a positive electrode and detachment of an active mass material therein during the charge and discharge at a high temperature and a high voltage.

DETAILED DESCRIPTION

Exemplary embodiments will hereinafter be described in detail. However, these embodiments are exemplary, and this disclosure is not limited thereto.

The rechargeable lithium battery according to one embodiment includes a negative electrode including a negative active material, a positive electrode including polyacrylonitrile and a positive active material which is capable of fully charging at about 4.3V or more; and a non-aqueous electrolyte.

In one embodiment, a positive electrode of a rechargeable lithium battery includes a high voltage positive active material but also, polyacrylonitrile capable of increasing binding properties and thus, decreasing its volume change and detachment of an active mass material therefrom, which may occur during the charge and discharge at a high temperature and at a high voltage.

In general, a rechargeable lithium battery may be classified as a lithium ion battery, a lithium ion polymer battery, and a lithium polymer battery according to the presence of a separator and the kind of an electrolyte used therein. The rechargeable lithium battery may have a variety of shapes and sizes and thus, may be a cylindrical, prismatic, coin, or pouch-type battery and be a thin film type or a bulky type in size. The structure and fabricating method for a lithium ion battery pertaining to the present invention can be any suitable structure and fabricating method.

Figure 1:
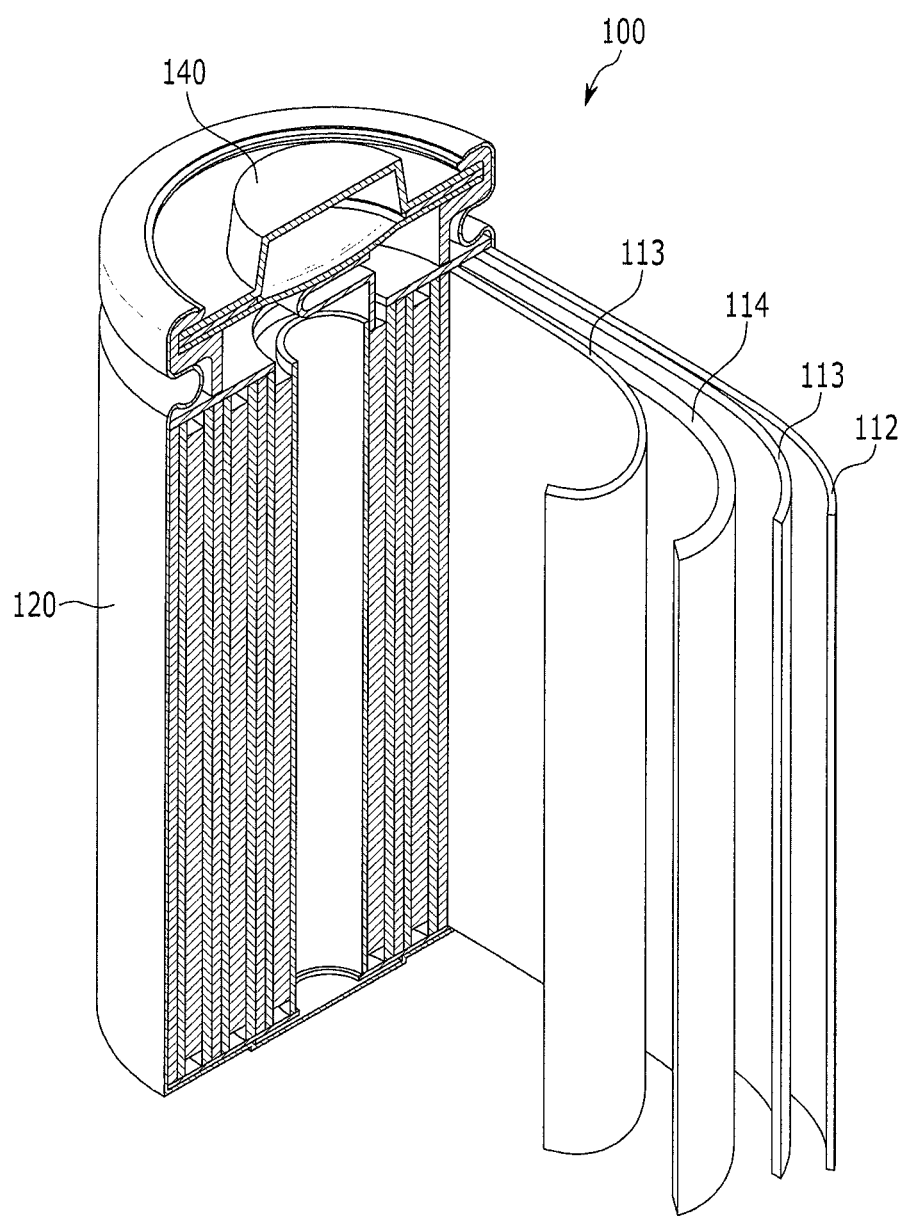
FIG. 1 is a schematic view of a rechargeable lithium battery according to one embodiment of the present invention.

FIG. 1 is an exploded perspective view showing the schematic structure of a rechargeable lithium battery. Referring to FIG. 1, the rechargeable lithium battery 100 includes a negative electrode 112, a positive electrode 114, a separator 113 interposed between the negative electrode 112 and the positive electrode 114, an electrolyte with (e.g., impregnating) the negative electrode 112, the positive electrode 114, and the separator 113, a battery case 120, and a sealing member 140 sealing the battery case 120. Here, in one embodiment, the rechargeable lithium battery 100 is fabricated by sequentially laminating the negative electrode 112, the positive electrode 114, and the separator 113, spirally winding them, and housing the spiral-wound product in the battery case 120.

The negative electrode includes a current collector and a negative active material layer disposed on the current collector. Here, in one embodiment, the negative active material layer includes a negative active material.

The negative active material includes a material that reversibly intercalates/deintercalates lithium ions, a lithium metal, a lithium metal alloy, a material being capable of doping and dedoping lithium, or a transition metal oxide.

The material that may reversibly intercalate/deintercalate lithium ions includes a carbon material. The carbon material may be any carbon-based negative active material generally used in a lithium ion rechargeable battery. Examples of the carbon material include crystalline carbon, amorphous carbon, and mixtures thereof. The crystalline carbon may be non-shaped, or sheet, flake, spherical, or fiber-shaped natural graphite or artificial graphite. The amorphous carbon may be a soft carbon, a hard carbon, a mesophase pitch carbonized product, fired coke, or the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, Sn, and combinations thereof.

Examples of the material being capable of doping lithium include Si, SiO$_x$ (0<x<2), a Si—C composite, a Si-Q alloy (wherein Q is an alkali metal, an alkaline-earth metal, group 13 to 16 elements, a transition element, a rare earth element, or a combination thereof, and not Si), Sn, SnO$_2$, a Sn—C composite, a Sn—R alloy (wherein R is an alkali metal, an alkaline-earth metal, group 13 to 16 elements, a transition element, a rare earth element, or a combination thereof, and not Sn), and the like. At least one of these materials may be mixed with SiO$_2$. The elements Q and R may each be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

Examples of the transition metal oxide include vanadium oxide, lithium vanadium oxide, and the like.

The negative active material layer includes a binder and optionally, a conductive material.

The binder improves binding properties of negative active material particles with one another and with a current collector. Examples of the binder include at least one selected from polyvinylalcohols, carboxylmethylcelluloses, hydroxypropylcelluloses, polyvinylchlorides, carboxylated polyvinylchlorides, polyvinylfluorides, ethylene oxide-containing polymers, polyvinylpyrrolidones, polyurethanes, polytetrafluoroethylenes, polyvinylidene fluorides, polyethylenes, polypropylenes, styrene-butadiene rubbers, acrylated styrene-butadiene rubbers, epoxy resins, nylons, and combinations thereof, but is not limited thereto.

The conductive material improves electrical conductivity of a negative electrode. Any electrically conductive material can be used as a conductive agent, unless it causes a chemical change. Examples of the conductive material include at least one selected from carbon-based materials such as natural graphites, artificial graphites, carbon blacks, acetylene blacks, ketjen blacks, carbon fibers, and combinations thereof; a metal-based material of a metal powder or a metal fiber including copper, nickel, aluminum, silver or the like; a conductive polymer such as a polyphenylene derivative, or the like; and mixtures thereof.

The current collector includes a copper foil, a nickel foil, a stainless steel foil, a titanium foil, a nickel foam, a copper foam, a polymer substrate coated with a conductive metal, or a combination thereof.

The positive electrode may include a current collector and a positive active material layer formed on the current collector. The positive electrode includes a high voltage positive active material but also, polyacrylonitrile capable of increasing binding properties and thus, decreasing its volume change and detachment of an active mass material therefrom, which may occur during the charge and discharge at a high temperature and at a high voltage.

Generally, a lithium salt such as LiPF$_6$ included in an electrolyte is decomposed and generates HF at a high voltage and a high temperature and thus, makes metal ions easily eluted from the positive active material, deteriorating high temperature storage and cycle performance. Accordingly, HF generation needs to be suppressed to prevent elution of metal ions. In order to prevent the positive electrode from generating HF, a positive active material layer therein may be formed by mixing a polyacrylonitrile binder including no fluorine with a positive active material. As a result, the positive electrode may improve elution of metal ions by suppressing HF generation and thus, high temperature performance.

In addition, the positive electrode includes a polyacrylonitrile binder and improves elution of metal ions, because the polyacrylonitrile traps metal ions eluted from the positive electrode at a high temperature.

In particular, when a rechargeable lithium battery including a level 5V spinel-based positive active material is maintained at a high temperature, Mn is eluted (Mn$^{2+}$ ion generation) from a positive electrode, and the Mn$^{2+}$ ions move to a negative electrode and receive electrons there, and are precipitated on the surface of the negative electrode. When the rechargeable lithium battery is kept at a high temperature, Mn keeps being eluted from a positive electrode while Mn keeps being deposited at a negative electrode. As a result, the negative electrode has an increased potential, which destroys cell balance and subsequently deteriorates capacity. However, in one embodiment, a positive electrode including polyacrylonitrile as a binder plays a role of suppressing the deposition phenomenon at a negative electrode, because the unshared electron pair of a nitrile group in the main chain of the polyacrylonitrile has an ion-dipole interaction (—C≡N: . . . Mn$^{2+}$) with Mn$^{2+}$ (soluble) ions and traps them.

In this way, the rechargeable lithium battery may realize high voltage, specifically, a voltage of more than about 4.3V when fully charged, and more specifically, a voltage ranging from about 4.35V to about 5.0V when fully charged.

The rechargeable lithium battery in particular includes a positive active material such as lithium manganese-based oxide, a lithium cobalt phosphate compound, or the like and thus, may accomplish a high voltage.

For example, the high voltage positive active material may be represented by the following Chemical Formula 1 or 2.

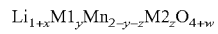   Chemical Formula 1

In the above Chemical Formula,

0≤x<0.2, 0.4≤y≤0.6, 0≤z≤0.2, 0≤w≤0.1,

M1 is a metal ion selected from Cr, Fe, Co, Ni, Cu, Zr, Ti, B, and combinations thereof, and M2 is a metal ion selected from Al, Ti, Mg, Zn, and combinations thereof.

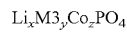   Chemical Formula 2

In the above Chemical Formula, $0 \leq x \leq 2$, $0.98 \leq y \leq 1$, $0.00 \leq z \leq 0.02$, and M3 is a metal ion selected from Co, Ni, Zr, Ti, B, and combinations thereof.

The positive active material may be a compound with the coating layer on the surface or a mixture of the active material and a compound with the coating layer thereon. The coating layer may include at least one coating element compound selected from the group consisting of oxides of the coating element, hydroxides of the coating element, oxyhydroxides of the coating element, oxycarbonates of the coating element, and hydroxycarbonates of the coating element. The compound for the coating layer may be either amorphous or crystalline. The coating element included in the coating layer may be selected from Mg, Al, Co, K, Na, Ca, Si, Ti, V, Sn, Ge, Ga, B, As, Zr and mixtures thereof.

The coating process may include any suitable processes unless it causes a side effect on the properties of the positive active material (e.g., spray coating, immersing, etc.).

The positive active material layer may further include oxalic acid as a binder. When oxalic acid as an additive is further added to a polyacrylonitrile binder, the oxalic acid may not only effectively suppress electrode expansion due to high binding property with a positive active material but also improve adherence to the positive active material through a chelating reaction with a current collector. In addition, acrylonitrile is highly crystalline and may be brittle and detached from a current collector, but oxalic acid is added thereto and may improve adherence of the acrylonitrile to a current collector. Accordingly, oxalic acid may maintain properties of the acrylonitrile as a binder.

The positive active material layer may further include an additional binder other than polyacrylonitrile. The additional binder may include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride-tetrafluoroethylene copolymer, polyvinylidenefluoride, polyacrylonitrile-alkyl(meth)acrylate (wherein alkyl is a C1 to C10 alkyl group), polyethylene, polypropylene, a styrene-butadiene rubber, an acrylated styrene-butadiene rubber, an epoxy resin, nylon, or the like, but is not limited thereto.

The binder improves binding properties of the positive active material particles to one another and to a current collector.

The positive electrode may include polyacrylonitrile in an amount ranging from about 1 wt % to about 5 wt % based on 100 wt % of the positive electrode except for a current collector or 100 wt % of a positive active material layer. In one embodiment, when polyacrylonitrile is included within the range, a nitrile group plays a role of trapping transition element ions capable of being eluted from a positive active material into an electrolyte at a high voltage and a high temperature and particularly, about 60° C. during the cycle-life evaluation, thereby improving cycle-life characteristic.

The oxalic acid may be included in an amount ranging from about 0.1 wt % to about 0.4 wt % based on 100 wt % of the sum of polyacrylonitrile and the oxalic acid; or about 0.1 wt % to about 0.4 wt % based on 100 wt % of the sum of polyacrylonitrile, the oxalic acid, and the additional binder.

The polyacrylonitrile and the additional binder may be included in a weight ratio ranging from about 2:3 to about 3:2.

The positive active material layer may include a conductive material.

The conductive material improves electrical conductivity of an electrode. Any electrically conductive material can be used as a conductive agent unless it causes a chemical change. Examples of the conductive material include at least one selected from natural graphites, artificial graphites, carbon blacks, acetylene blacks, ketjen blacks, carbon fibers, metal powders, metal fibers of copper, nickel, aluminum, silver, and the like, and polyphenylene derivatives.

The current collector may be Al but is not limited thereto.

The negative and positive electrodes may be fabricated in a method of preparing an active material composition by mixing the active material, a conductive material, and a binder and coating the composition on a current collector. The electrode manufacturing method is well known and thus, is not described in detail in the present specification. The solvent includes N-methylpyrrolidone and the like but is not limited thereto.

The electrolyte may include a non-aqueous organic solvent and a lithium salt.

In one embodiment, the non-aqueous organic solvent plays a role of transmitting ions taking part in the electrochemical reaction of a battery.

The non-aqueous organic solvent may include a carbonate-based, ester-based, ether-based, ketone-based, alcohol-based, or aprotic solvent but is not limited thereto. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like, and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, or the like. The ether-based solvent may include dibutyl ether, tetraglyme, diglyme, dimethoxyethane, 2-methyltetrahydrofuran, tetrahydrofuran or the like. The ketone-based solvent may include cyclohexanone, or the like. The alcohol-based solvent may include ethanol, isopropylalcohol, or the like. The aprotic solvent include nitriles such as R—CN(wherein R is a C2 to C20 linear, branched, or cyclic hydrocarbon group, and may include a double bond, an aromatic ring, or an ether bond), amides such as dimethylformamide, dimethylacetamide, dioxolanes such as 1,3-dioxolane, sulfolanes, or the like.

The non-aqueous organic solvent may be used singularly or in a mixture. When the organic solvent is used in a mixture, its mixture ratio may be controlled in accordance with desirable performance of a battery.

The carbonate-based solvent may include a mixture of a cyclic carbonate and a linear carbonate. The cyclic carbonate and the linear carbonate are mixed together in a volume ratio of about 1:1 to about 1:9 as the electrolyte, and the electrolyte may have enhanced performance.

In addition, the non-aqueous organic solvent may be prepared by further adding the aromatic hydrocarbon-based solvent to the carbonate-based solvent. The carbonate-based solvent and the aromatic hydrocarbon-based solvent are mixed together in a volume ratio of about 1:1 to about 30:1.

The aromatic hydrocarbon-based organic solvent may be an aromatic hydrocarbon-based compound represented by the following Chemical Formula 3.

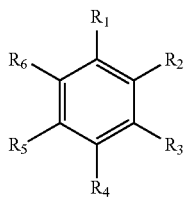

Chemical Formula 3

In Chemical Formula 3, $R_1$ to $R_6$ are each independently hydrogen, halogen, a C1 to C10 alkyl group, a C1 to C10 haloalkyl group, or a combination thereof.

The aromatic hydrocarbon-based organic solvent may include, but is not limited to, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound represented by the following Chemical Formula 4 in order to improve cycle-life of a battery.

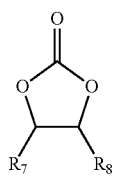

Chemical Formula 4

In Chemical Formula 4, $R_7$ and $R_8$ are each independently hydrogen, a halogen, a cyano group (CN), a nitro group ($NO_2$) or a C1 to C5 fluoroalkyl group, provided that at least one of $R_7$ and $R_8$ is a halogen, a cyano group (CN), a nitro group ($NO_2$) or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the vinylene carbonate or the ethylene carbonate-based compound for improving cycle life may be adjusted.

The lithium salt is dissolved in the non-aqueous solvent and supplies lithium ions in a rechargeable lithium battery, and basically operates the rechargeable lithium battery and improves lithium ion transfer between positive and negative electrodes. The lithium salt includes at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato)borate, LiBOB), and combinations thereof. The lithium salt may be used in a concentration of about 0.1M to about 2.0M. In one embodiment, when the lithium salt is included within the above concentration range, it improves electrolyte performance and lithium ion mobility due to optimal electrolyte conductivity and viscosity.

The separator 113 plays a role of separating a negative electrode 112 from a positive electrode 114 and providing a path for lithium ions and may include any suitable separator used for a lithium battery. In other words, the separator has low resistance against ion transfer in an electrolyte and excellent moisturizing capability in the electrolyte. For example, the separator may include glass fiber, polyester, TEFLON (tetrafluoroethylne), polyethylene, polypropylene, polytetrafluoroethylene (PTFE), or a combination thereof; and may be non-woven fabric or fabric. For example, a polyolefin-based polymer separator (such as polyethylene or the like) may be used for a lithium ion battery, and a separator coated with a ceramic component or a polymer material may be used to secure heat resistance or mechanical strength. The separator may have selectively a single layer or multi-layers.

The following examples illustrate the present invention in more detail. These examples, however, should not be interpreted as limiting the scope of the present invention.

PREPARATION EXAMPLES

Preparation Example 1

Fabrication of Positive Electrode 94 wt % of $LiNi_{0.5}Mn_{1.5}O_4$ with a particle size of 10 micrometer as a positive active material, 3 wt % of a carbon-based conductive agent (Super P, carbon black), and 3 wt % of polyacrylonitrile as a binder were dispersed in N-methyl-2-pyrrolidone, thereby preparing a slurry. The slurry was coated on an aluminum substrate and then, dried at 110° C. and compressed, thereby fabricating a positive electrode.

Preparation Example 2

Fabrication of Positive Electrode

A positive electrode was fabricated according to the same method as Preparation Example 1 except for using a binder prepared by mixing polyacrylonitrile and polyvinylidenefluoride in a weight ratio of 1:1.

Preparation Example 3

Fabrication of Positive Electrode

A positive electrode was fabricated according to the same method as Preparation Example 1 except for using polyacrylnitrile and oxalic acid as a binder, which includes the oxalic acid in an amount of 0.2 wt % based on 100 wt % of the sum of the oxalic acid and the polyacrylnitrile.

Preparation Example 4

Fabrication of Positive Electrode

A positive electrode was fabricated according to the same method as Preparation Example 1 except for using polyvinylidene fluoride as a binder.

Preparation Example 5

Fabrication of Positive Electrode

A positive electrode was fabricated according to the same method as Preparation Example 1 except for using $LiMn_2O_4$ as a positive active material.

Preparation Example 6

Fabrication of Positive Electrode

A positive electrode was fabricated according to the same method as Preparation Example 1 except for using $LiMn_2O_4$ as a positive active material and polyvinylidenefluoride as a binder.

Examples 1 to 3

Half coin cells were fabricated by using each positive electrode according to Preparation Examples 1 to 3 and an electrolyte prepared by mixing EC (ethylenecarbonate)/EMC (ethylmethylcarbonate)/DEC (diethylcarbonate) in a volume ratio of 3/2/5 to prepare a mixed solvent, dissolving 1.15M $LiPF_6$ and 0.2 wt % of $LiBF_4$ in the mixed solvent, and adding 5 wt % of FEC (fluoroethylenecarbonate) thereto.

Comparative Examples 1 to 3

Each half coin cell was fabricated according to the same method as Examples 1 to 3 by relatively using the positive electrodes according to Preparation Examples 4 to 6.

Experimental Example

Adherence Test

The positive electrodes (Preparation Examples 3 and 4) used in Examples 3 and Comparative Example 1 were measured regarding adherence of a positive active material to a current collector. The positive electrodes were cut to have a width of 25.4 cm and attached to a slide glass and then, measured regarding 180° peeling strength while the current collectors were peeled off therefrom using Instron. The evaluation was performed by measuring three or more positive electrodes and calculating an average. The result is provided in the following Table 1.

TABLE 1

|  | Example 3 (Preparation Example 3) | Comparative Example 1 (Preparation Example 4) |
|---|---|---|
| Electrode adherence (gf/mm) | 3.21 | 0.80 |

Battery Characteristic

The cells were once charged and discharged with charge and discharge current density of 0.1 C, charge cut-off voltage of 4.9V(Li/Li⁺), and discharge cut-off voltage of 3.0 V(Li/Li⁺). Then, the cells were once charged and discharged with charge and discharge current density of 0.2 C and 0.5 C, respectively, under the above charge and discharge cut-off voltage condition and then, 50 times with current density of 1.0 C. All the evaluations were performed in a 60° C. high temperature chamber. All the charges and discharges were performed with a constant current. After the 53 cycles in total, the cells were measured regarding charge and discharge efficiency (discharge capacity/charge capacity, initial efficiency) and discharge capacity (initial capacity) at the first cycle. Then, the cells were measured regarding capacity retention by dividing discharge capacity at 50th cycle by discharge capacity at the first cycle with 1 C to calculate a capacity ratio (50th/1st). Three or more half coin cells in each Example 1 to 3 and Comparative Example 1 were fabricated and calculated to provide an average. The results are provided in FIG. 2 and Table 2.

TABLE 2

|  | Initial capacity (mAh/g) | Initial discharge efficiency (%) | Capacity retention at $50^{th}$ cycle (%) |
|---|---|---|---|
| Example 1 | 118.6 | 82.1 | 62.1 |
| Example 2 | 118.2 | 81.3 | 69.4 |
| Example 3 | 111.6 | 74.6 | 75.1 |
| Comparative Example 1 | 114.6 | 79.1 | 12.0 |

Figure 2:
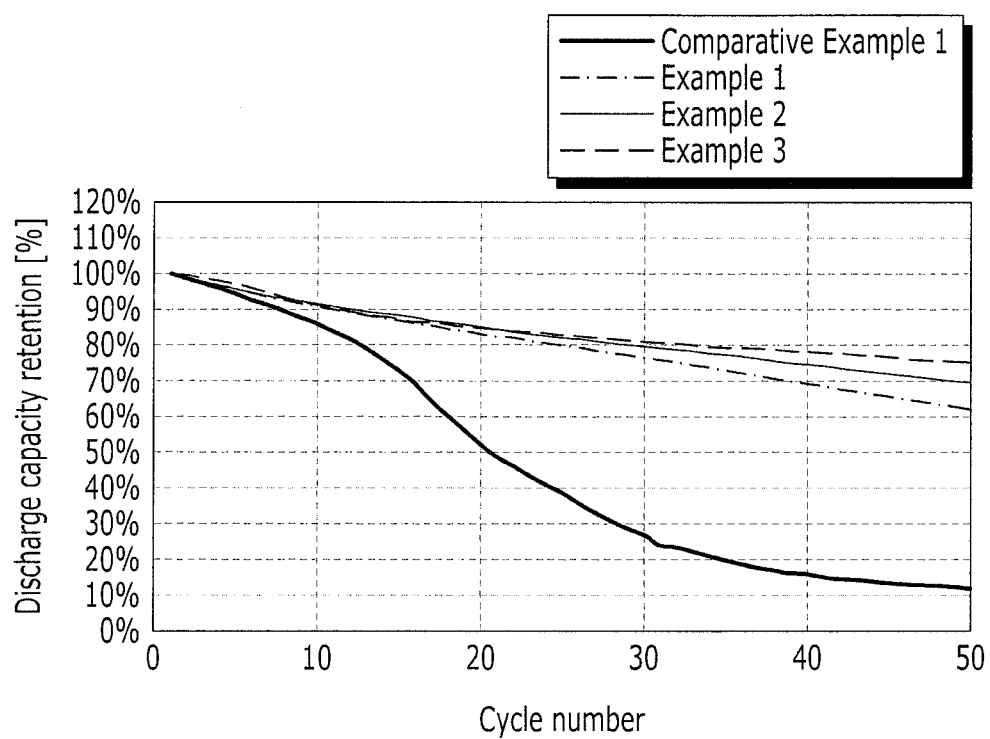
FIG. 2 is a graph showing high temperature cycle-life characteristic of high voltage rechargeable lithium battery cells according to Example and Comparative Example.
Figure 3:
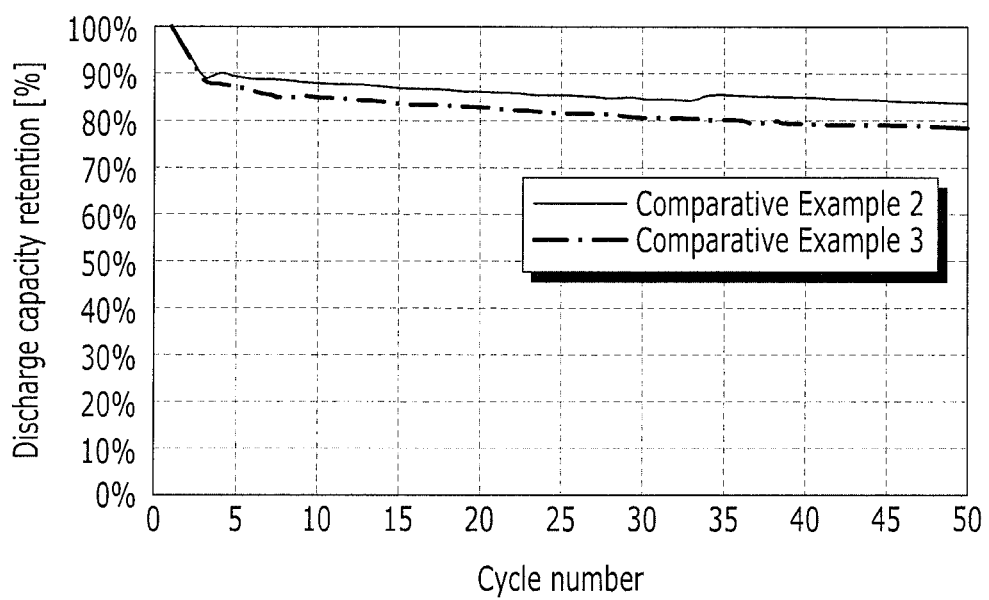
FIG. 3 is a graph showing high temperature cycle-life characteristics of a low voltage rechargeable lithium battery cell according to Comparative Example.

FIG. 3 provides cycle-life characteristic of the half coin cells according to Comparative Examples 2 and 3 by charging and discharging the cells with 4.2-3.0V in a 60° C. high temperature chamber. Comparing the cells using charge cut-off voltage of 4.2V according to Comparative Examples 2 and 3, the cell using a polyacrylonitrile binder according to Comparative Example 2 had no more cycle-life characteristic improvement at a high temperature than the cell including a polyvinylidenefluoride binder according to Comparative Example 3. On the other hand, the cells according to Examples 1 to 3 had improved discharge capacity retention compared with the cell according to Comparative Example 1 as shown in FIG. 2 (referring to Table 2 and FIG. 2). Accordingly, when a polyacrylonitrile binder was applied to a high voltage rechargeable lithium battery, the high voltage rechargeable lithium battery had much improved cycle-life characteristic at a high temperature. The reason is that a polyacrylonitrile binder did not provide F and suppressed HF generation, which might occur at a high temperature and thus, decreased elution of metal ions from a positive active material. Therefore, the positive electrode according to the present invention may accomplish cycle-life improvement within a high voltage range.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable lithium battery, comprising:
   a negative electrode comprising a negative active material;
   a positive electrode comprising polyacrylonitrile and a positive active material; and
   a non-aqueous electrolyte with the positive electrode and the negative electrode, wherein the positive active material is a compound represented by the following Chemical Formula 1 or 2:

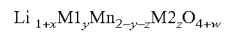  Chemical Formula 1

$Li_{1+x}M1_yMn_{2-y-z}M2_zO_{4+w}$ wherein,
   0≤x≤0.2, 0.4≤y≤0.6, 0≤z≤0.2, 0≤w≤0.1,
   M1 is a metal ion selected from Cr, Fe, Co, Ni, Cu, Zr, Ti, B, and combinations thereof, and
   M2 is a metal ion selected from Al, Ti, Mg, Zn, and combinations thereof;

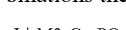  Chemical Formula 2

$Li_xM3_yCo_zPO_4$ wherein, $0 \leq x \leq 2$, $0.98 \leq y \leq 1$, $0.00 \leq z \leq 0.02$, and M3 is a metal ion selected from Co, Ni, Zr, Ti, B, and combinations thereof, wherein the positive electrode comprises a current collector and a positive active material layer, wherein the positive active material layer comprises about 1 wt % to about 5 wt % of the polyacrylonitrile based on 100 wt % of the positive active material layer, and wherein the positive electrode further comprises oxalic acid in an amount ranging from about 0.1 wt % to about 0.4 wt % based on 100 wt % of the sum of the polyacrylonitrile and the oxalic acid.

2. The rechargeable lithium battery of claim 1, wherein the positive electrode comprises an additional binder selected from polyvinyl alcohols, carboxylmethylcelluloses, hydroxypropylcelluloses, diacetylcelluloses, polyvinylchlorides, carboxylated polyvinylchlorides, polyvinylfluorides, ethylene oxide-containing polymers, polyvinylpyrrolidones, polyurethanes, polytetrafluoroethylenes, polyvinylidenefluoride-tetrafluoroethylenes copolymer, polyvinylidenefluorides, polyacrylonitrile-alkyl(meth)acrylates (wherein alkyl is a C1 to C10 alkyl group), polyethylenes, polypropylenes, styrene-butadiene rubbers, acrylated styrene-butadiene rubbers, epoxy resins, nylons, and combinations thereof.

3. The rechargeable lithium battery of claim 2, wherein the polyacrylonitrile and the additional binder are added in a weight ratio ranging from about 2:3 to about 3:2.

4. The rechargeable lithium battery of claim 2, wherein the oxalic acid is comprised in an amount ranging from about 0.1 to about 0.4 wt % based on 100 wt % of the sum of polyacrylonitrile, the oxalic acid, and the additional binder.

* * * * *